(12) United States Patent
Saegesser et al.

(10) Patent No.: US 6,877,234 B2
(45) Date of Patent: Apr. 12, 2005

(54) MANUAL SABER SAW MACHINE

(75) Inventors: Daniel Saegesser, Langenthal (CH); Sacha Felder, Langendorf SO (CH)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/469,746

(22) PCT Filed: Nov. 21, 2002

(86) PCT No.: PCT/DE02/04285

§ 371 (c)(1),
(2), (4) Date: Sep. 4, 2003

(87) PCT Pub. No.: WO03/066287

PCT Pub. Date: Aug. 14, 2003

(65) Prior Publication Data

US 2004/0068877 A1 Apr. 15, 2004

(30) Foreign Application Priority Data

Feb. 9, 2002 (DE) .......................... 102 05 378

(51) Int. Cl.$^7$ ................................. B25F 5/02
(52) U.S. Cl. .................. 30/392; 30/125; 30/394
(58) Field of Search .................... 30/392–394, 123, 30/124

(56) References Cited

U.S. PATENT DOCUMENTS

| 3,353,573 A | 11/1967 | Hitzeroth |
| 4,614,037 A | 9/1986 | Somers |
| 6,434,836 B1 * | 8/2002 | Olivares ................ 30/277.4 |

FOREIGN PATENT DOCUMENTS

DE            201 00 952 U    4/2001

* cited by examiner

Primary Examiner—Douglas D Watts
(74) Attorney, Agent, or Firm—Michael J. Striker

(57) ABSTRACT

A reciprocating hand saw with a housing has a motor, a gearbox with a lifting rod for moving a saw blade mounted thereon up and down, and a base plate on which the housing is mounted, capable of carrying particularly easy-to-handle spare saw blades by the fact that the housing has an opening into which a magazine-like, longitudinal saw blade receptacle is capable of being inserted in a detachable, captive manner, and a part of the saw blade receptacle serving as grip projects outwardly.

8 Claims, 5 Drawing Sheets

MANUAL SABER SAW MACHINE

BACKGROUND OF THE INVENTION

The present invention is based on a reciprocating hand saw.

Reciprocating hand saws are already known with which one or more spare saw blades can be stored in their housing. Previous saw blade receptacles are integrated in the housing and are capable of being closed with a cover. After the cover is opened, removing the saw blades stored in the container is a time-consuming, awkward procedure, with the sharp saw teeth increasing the risk of injury.

SUMMARY OF THE INVENTION

The reciprocating hand saw in accordance with the present invention has the advantage that the spare saw blades, together with a saw blade receptacle, can be located quickly, and said saw blade receptacle can be removed quickly and conveniently. Additionally, the manner in which the saw blades are stored in the saw blade receptacle permits rapid, convenient removal of the saw blades without risk of injury. As a result, saw blades can be replaced particularly quickly and in an uncomplicated manner.

Due to the fact that the grip of the saw blade receptacle forms a capsule-like region having an opening on the underside and, adjacent to this, is open at the top and back, the saw blade receptacle can be gripped securely, whereby the spare saw blades are easy to remove and refilling the saw blade receptacle is easy and convenient.

The fact that the saw blade receptacle is composed of elastic plastic makes it lightweight and capable of damping vibrations from the mounting in the housing as well as the spare saw blades stored therein.

Due to the fact that the saw blade receptacle is capable of being latched in the housing in a positive and non-positive manner by means of an overlatching spring located on the housing, the spare saw blades can be accessed conveniently and quickly, and they are stored securely against loss.

Due to the fact that the reciprocating saw contains a hold-down spring that bears against the saw blade located in the saw blade receptacle in a preloaded manner, said saw blades are secured against vibrations and rattling.

The fact that the hold-down spring is attached in the housing and extends from above into the saw blade receptacle permits the saw blade receptacle to be attached and removed easily.

The fact that both the hold-down spring and the overlatching spring are configured as leaf springs makes them particularly easy and cost-effective to manufacture and install, and they are lightweight and robust.

Due to the fact that a leaf spring is mounted on the end of the saw blade receptacle located underneath the saw blades to be inserted, which said leaf spring can be lifted by hand, the saw blades can be removed particularly conveniently and in a manner that protects from injury, after said leaf spring is lifted.

Due to the fact that two opposing grooves are provided at the end of the saw blade receptacle to allow engagement of the lateral lobes of the clamping end of the saw blade, the spare saw blades lie in a stack in the saw blade receptacle and in the housing of the reciprocating hand saw in an axially secured and vibration-damped manner.

BRIEF DESCRIPTION OF THE DRAWINGS

The present invention is explained in greater detail hereinbelow with reference to associated drawings.

DESCRIPTION OF THE PREFERRED EMBODIMENTS

Figure 1:
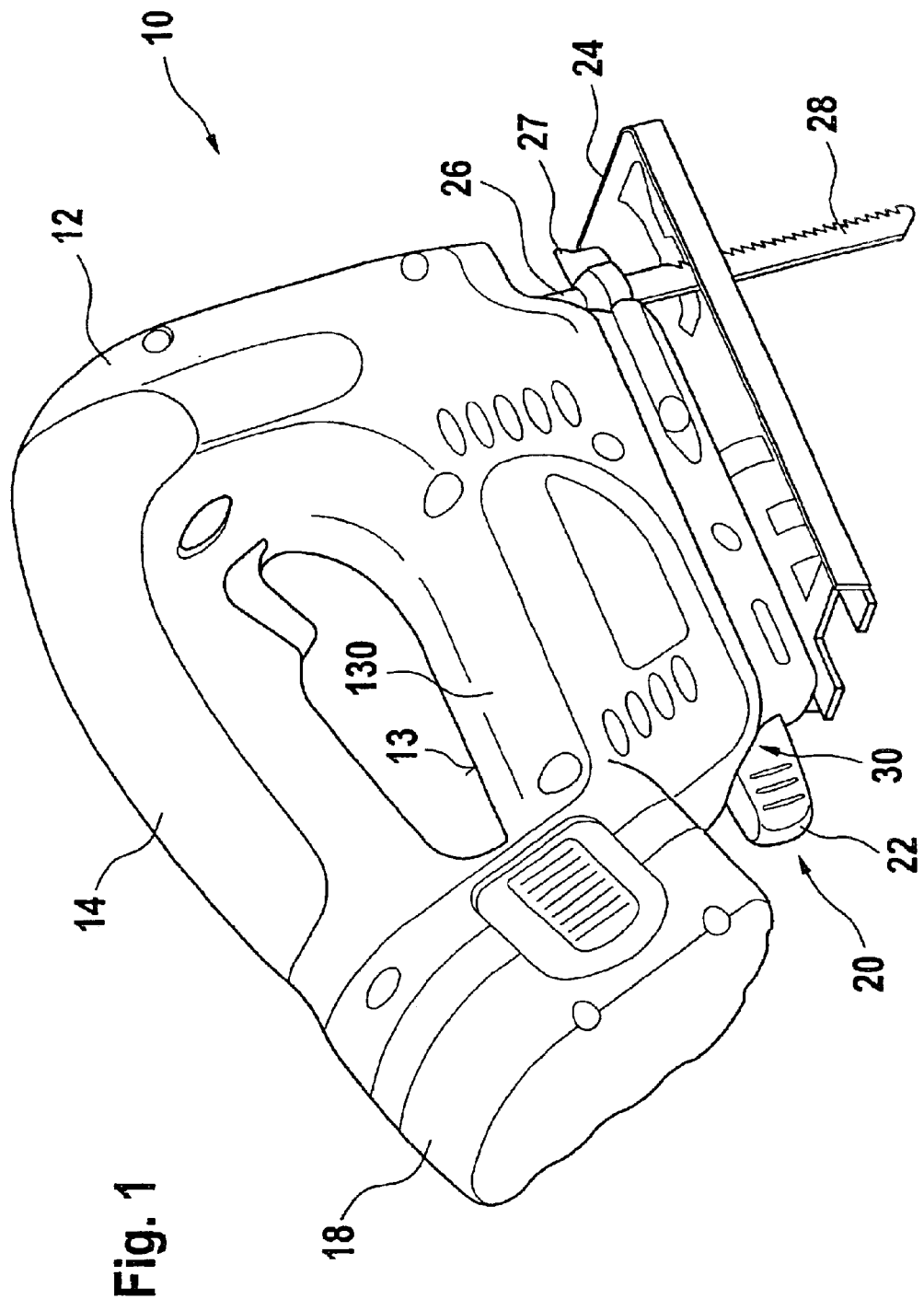
FIG. 1 is a spacial rear view of a reciprocating hand saw according to the invention.

FIG. 1 shows a battery-powered reciprocating hand saw 10 with a housing 12 that has a handle 14 on top. The underside of said handle has a push-button 16 for operating a not-shown on/off switch for the power supply of a motor 17 (FIGS. 2, 3) that is mounted between the housing shells 13, 130 of the housing 12.

A replaceable battery pack 18 is detachably mounted on the rear end of the housing 12. In addition, below the battery pack 18, the handle 22 of a longitudinal saw blade receptacle 20 extends rearward out of the housing 12. The saw blade receptacle 20 is capable of being inserted longitudinally into an opening 30 of the housing 12, and it is held in a detachable, captive manner along a groove-like channel 31 strengthened by longitudinal ribs 33.

The housing 12 is supported on a base plate 24 in a manner that allows it to turn at the bottom, said base plate serving as support foot when sawing is performed in mobile fashion.

Figure 2:
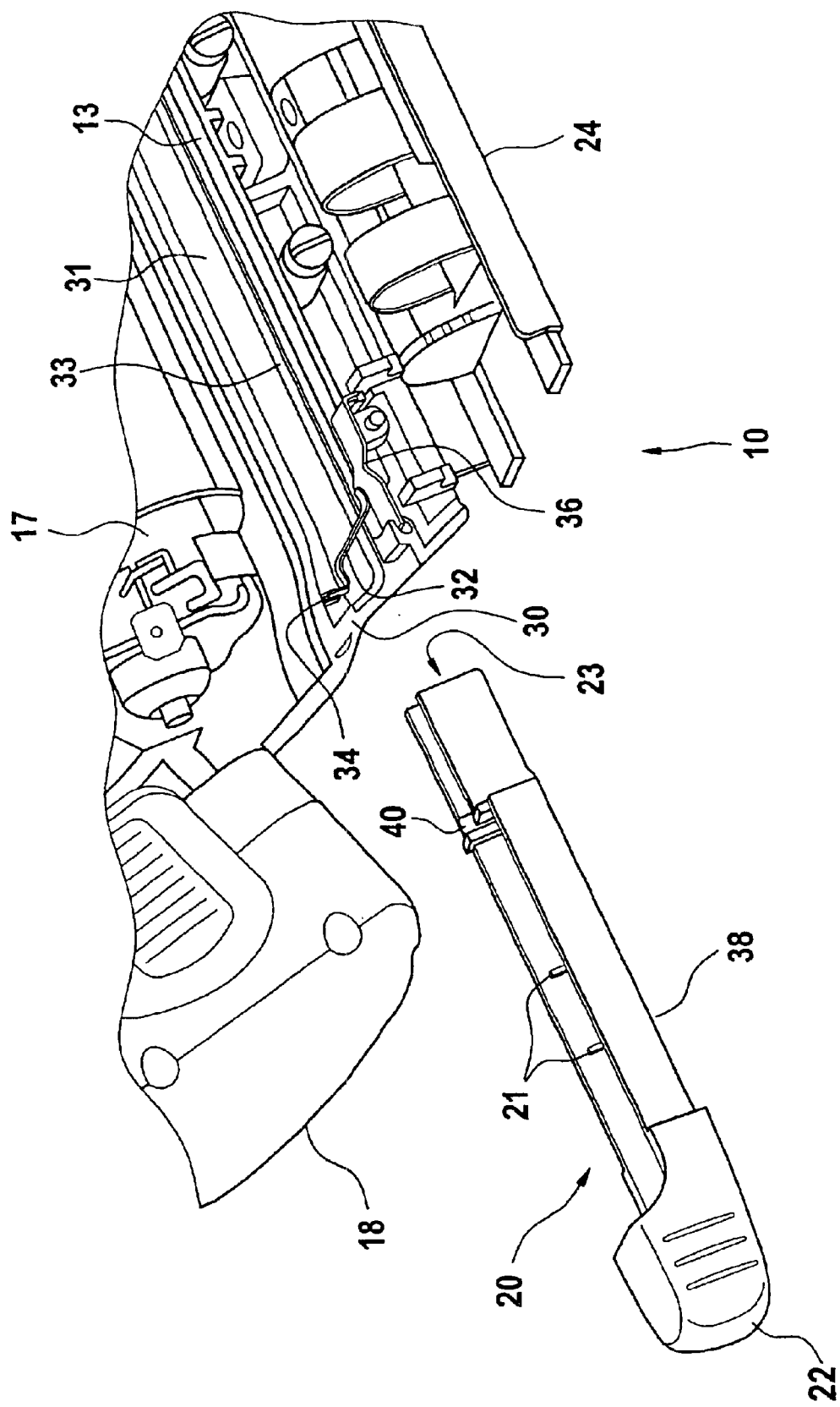
FIG. 2 is a section according to FIG. 1 with the saw blade receptacle removed.

FIG. 2 shows a section of the lower region of the left housing shell 13 as viewed from the plane of joint, with the saw blade receptacle 20 removed. One can see its positioning ribs 21 for assuring the position of inserted saw blades 28, especially in a stack, (FIGS. 4 through 7), as well as symmetrically opposed insertion grooves 40 for holding the lateral noses 69 of the clamping end 29 of the saw blade 28.

After the capsule-like handle 22, the saw blade receptacle 20 forms, in the longitudinal direction toward the front, a U-shaped profile that is open at the top.

In addition, one can see the longitudinal arrangement of the channel 31 with the longitudinal ribs 33 and an opening 30 at the rear end of the housing shell 13, that forms a negative contour of the grip 22 and encompasses it tightly when inserted. In addition, a hold-down spring 32 and a detent spring 36 are visible, both of which are configured as leaf springs and, in the ready-to-operate state, they are located in slits 34 and 37 in the housing shell 13 in a manner that is captively clampable and fixed in position in the housing.

The saw blade receptacle 20 has a recess 38 in its underside, into which a projection of the detent spring 36 can latch and thereby hold the saw blade receptacle 20 captive in the housing 12.

The detent spring 36 presses the saw blade receptacle 20 upward by engaging in the recess 38 in its base, and holds said saw blade receptacle securely in the housing 12, free from vibrations.

Figure 3:
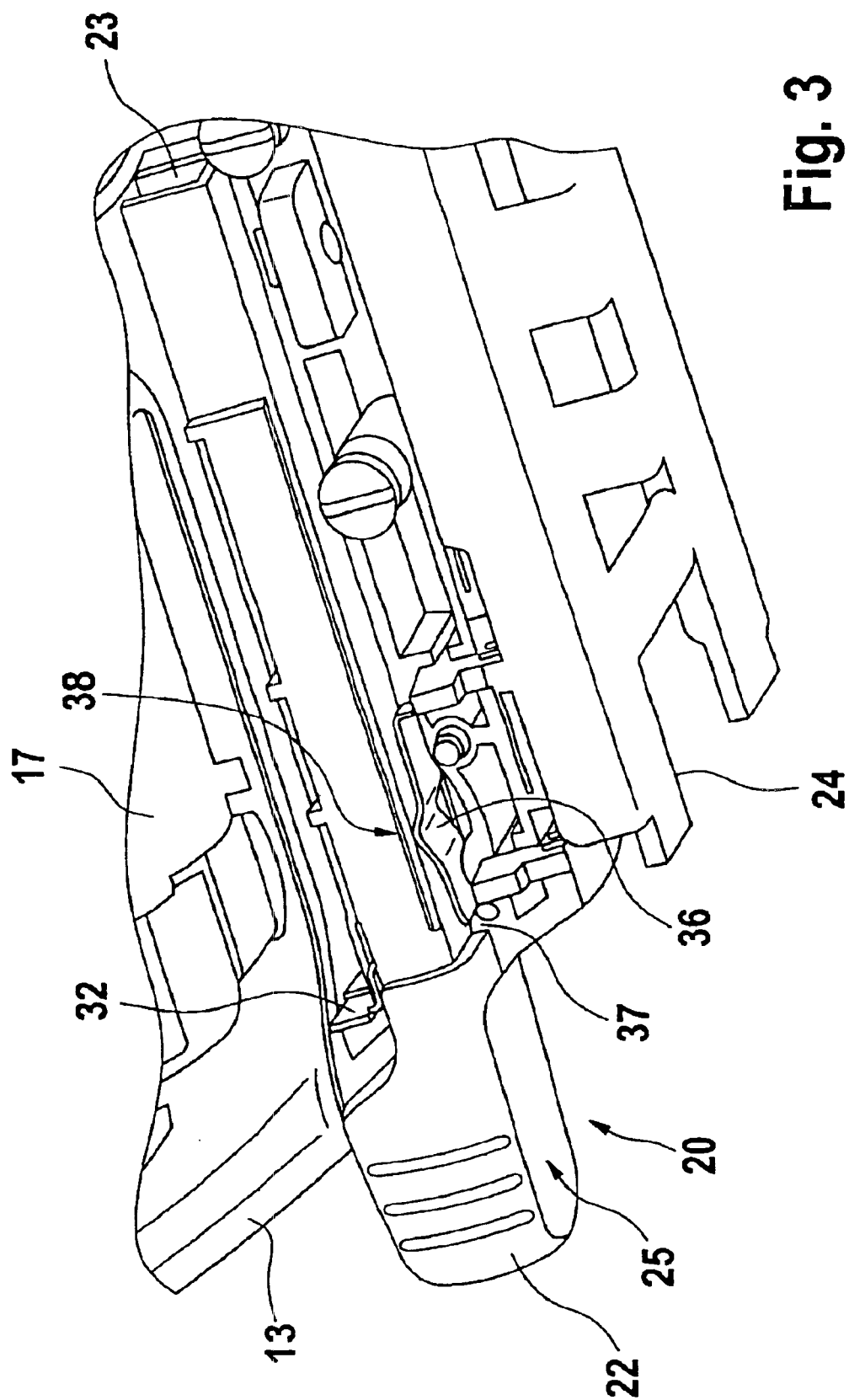
FIG. 3 is a section viewed at an angle from behind with installed saw blade receptacle with the upper housing shell removed.

FIG. 3 is an inside view of the left housing half-shell 13, and it shows that the grip 22 of the saw blade receptacle 20 has a downward-extending opening 25. By inserting his finger or thumb in the recess 25, the operator can grip the grip 22 securely and remove it, and he can hold the removed saw blade receptacle 20 securely in his hand.

Figure 4:
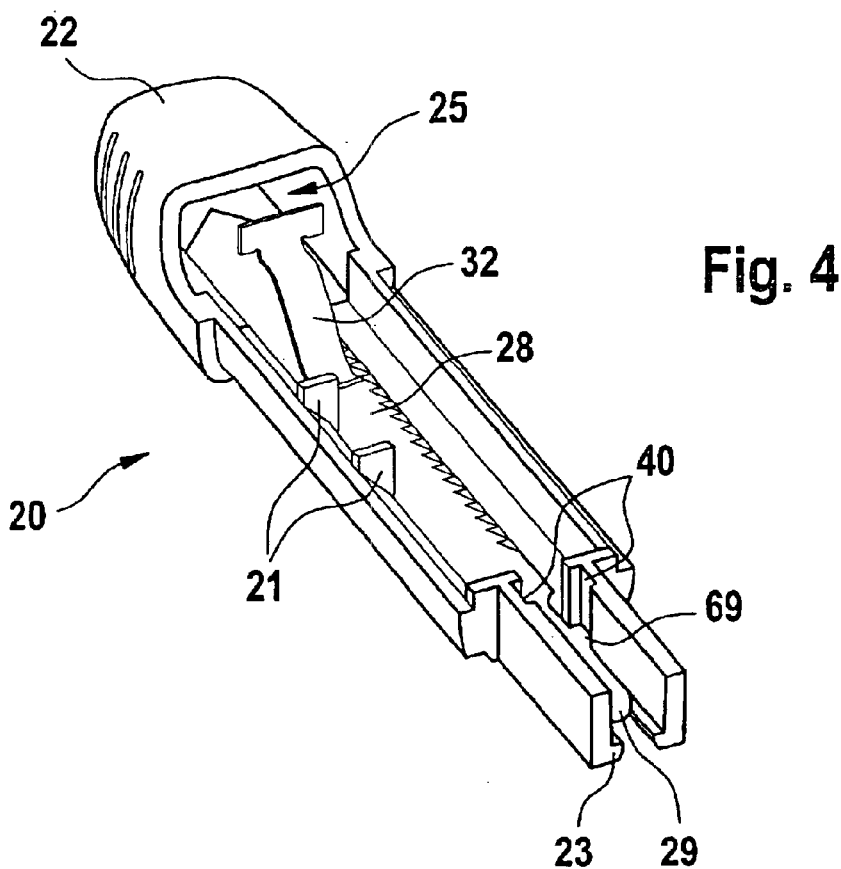
FIG. 4 is a rear view of the saw blade receptacle.

FIG. 4 shows the detail of the saw blade receptacle 20 with the end 23 pointing toward the observer. The saw blade 28 is situated therein with a hold-down spring 32 bearing against its upper flat side, therefore pressed downward on the bottom of the saw blade receptacle 20, safeguarded against vibrations and rattling.

Vertical positioning ribs 21 are mounted on the right longitudinal wall of the saw blade receptacle 20, which said positioning ribs extend transversely into the interior of the saw blade receptacle 20, and against which the back of the saw blade 28 rests. The clamping end 29 of the saw blade 28 is located in the rear end 23 of the saw blade receptacle 20. The lateral noses 69 are inserted in opposing grooves 40 with positive engagement and slight play.

All reciprocating saw blades with a T-shaped clamping profile and opposing noses 69 have the same dimensions in terms of saw blade back and clamping end 29. All saw blades 28 configured in this fashion therefore have an identical, vibration-free position after they are inserted in the saw blade receptacle 20.

The tip of the saw blade 28 extends freely into the lower opening 25 of the grip 22. After the saw blade receptacle 20 is removed, said saw blade can therefore be lifted upward by manually reaching through the opening 25 against the force of the hold-down spring 32; the lifted clamping end 29 can then be removed from the rear end 23 of the saw blade receptacle 20 particularly easily.

Figure 5:
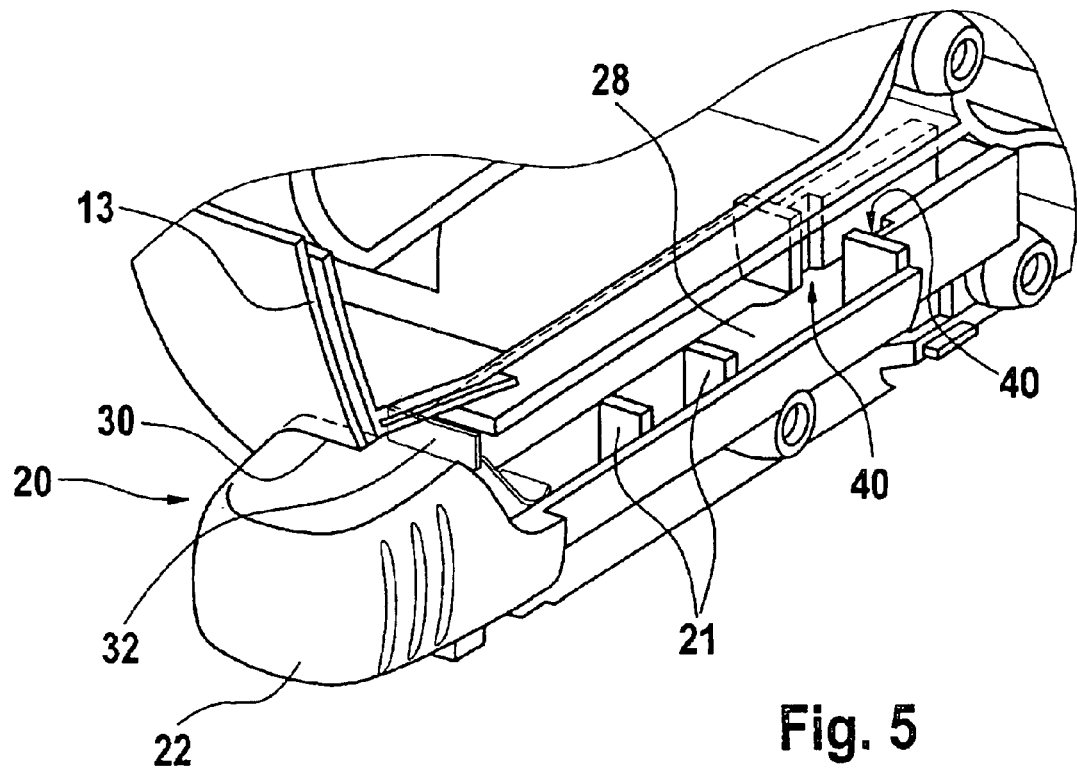
FIG. 5 shows the saw blade receptacle with spare saw blades inserted in the housing.

FIG. 5 shows the saw blade receptacle 20 inserted in the left housing shell 13 as viewed at an angle from the top at the back. The position of the hold-down spring 32, the positioning ribs 21 and the saw blade 28 is shown particularly clearly once more.

Figure 6:
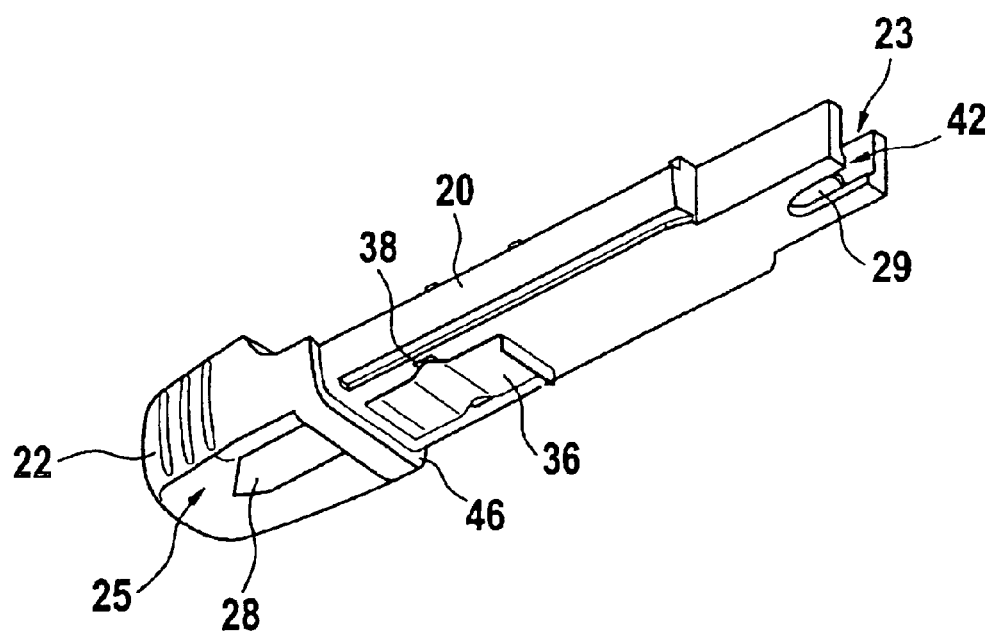
FIG. 6 is a view of the saw blade receptacle at an angle from below.

FIG. 6 shows the saw blade receptacle 20 at an angle from the bottom at the back. The tip of the saw blade 28 can be seen extending into the opening 25. Also shown clearly is the arrangement of the detent spring 36 fixed in position in the housing, with its upwardly extending projection that extends into a recess 38. Beyond the exemplary embodiments shown in the preceding figures, the saw blade receptacle 20 has a recess 42 in its underside on its end 23, through which the clamping end 29 of the saw blade 28 can be gripped particularly easily and safely removed.

Also shown clearly is the edge 46 between the grip 22 and the insertion region of the saw blade receptacle 20, which said edge serves as a stop when the saw blade receptacle 20 is inserted in the housing 12.

Figure 7:
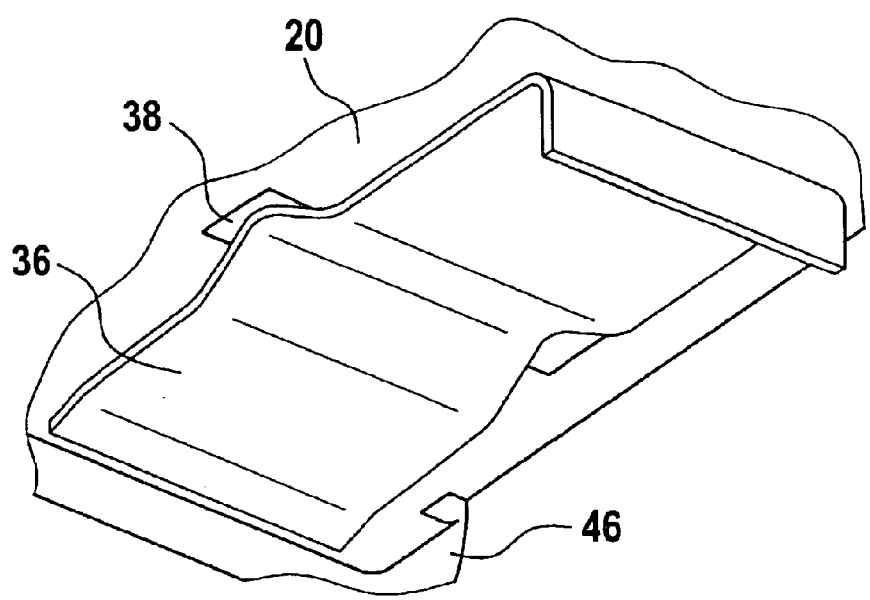
FIG. 7 is an enlarged underside view of the saw blade receptacle with detent spring.

FIG. 7 shows an enlarged section of the underside view of the saw blade receptacle 20 on its underside with the recess 38 into which a dome-shaped projection of the leaf spring-like detent spring 36 can latch.

The saw blade receptacle 20 can be removed completely from the reciprocating hand saw 10. Once said saw blade receptacle is outside of the reciprocating hand saw, it is particularly easy to remove spare saw blades and reload new ones.

The invention is not limited to reciprocating hand saws. Instead, it can also be used—in an adapted manner—for holding drill bits and bits for hand-held power drills, power-driven screwdrivers and the like, and for the longitudinal insertable tools of a sabre saw, a router or a planer.

What is claimed is:

1. A reciprocating hand saw (10) with a housing (12) comprising a motor (17), a gearbox with a lifting rod (26) for moving a saw blade (28) mounted thereon up and down, and a base plate (24) on which the housing (12) is mounted, wherein the housing (12) has an opening (30) into which a magazine-like, longitudinal saw blade receptacle (20) is capable of being inserted in a detachable, captive manner, and a part of the saw blade receptacle (20) serving as grip (22) projects outwardly, and wherein the grip (22) of the saw blade receptacle (20) forms a capsule-like region that is closed at least on the sides and in particular on the top, and the adjacent longitudinal part is a U-shaped profile that is open in the back.

2. The reciprocating hand saw according to claim 1, wherein the saw blade receptacle (20) is composed of plastic.

3. The reciprocating hand saw according to claim 1, wherein the saw blade receptacle (20) is capable of being held captive in the housing (12) by means of an overlatching spring (36) that is fixed in position in the housing, which said overlatching spring can engage in a matching recess in the saw blade receptacle (20).

4. The reciprocating hand saw according to claim 3, wherein it contains a hold-down spring (32) that acts on the saw blade (28) located in the saw blade receptacle (20) in a manner that safeguards against vibrations.

5. The reciprocating hand saw according to claim 1, wherein the hold-down spring (32) is attached in the housing (12) and extends from above into the saw blade receptacle (20), preferably bearing downward therein in a preloaded manner.

6. The reciprocating hand saw according to claim 1, wherein both the hold-down spring (32) and the overlatching spring (36) are configured as leaf springs.

7. The reciprocating hand saw according to claim 1, wherein a leaf spring is mounted on the end (23) of the saw blade receptacle (20) located underneath the saw blades (28) to be inserted, which said leaf spring can be lifted by hand, permitting the saw blades (28) to be lifted and easily removed, especially when the saw blade receptacle (20) is removed.

8. The reciprocating hand saw according to claim 1, wherein the color of the saw blade receptacle (20) contrasts with the color of the housing (12), and said color of the saw blade receptacle is a signal color in particular.

\* \* \* \* \*